June 22, 1926.
J. SILLERY
1,589,821
TRACTOR WHEEL
Filed Feb. 5, 1925
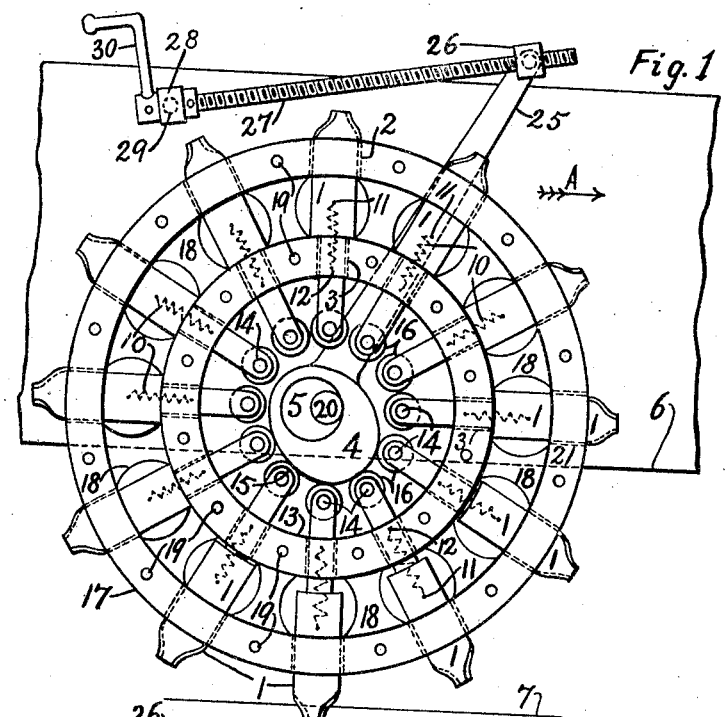
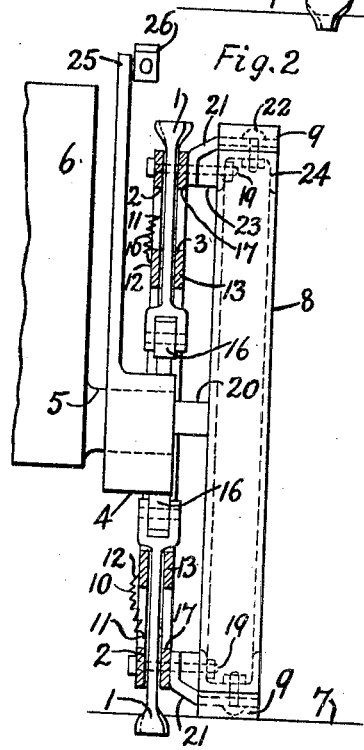
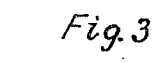
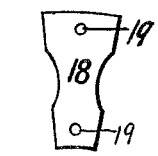
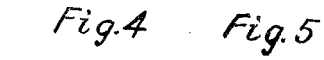
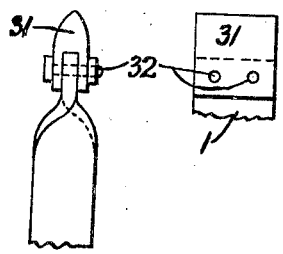
INVENTOR:
John Sillery.
BY
Wm. Ewart Doyle,
PATENT ATTORNEY.

Patented June 22, 1926.

1,589,821

UNITED STATES PATENT OFFICE.

JOHN SILLERY, OF NOBBER, IRISH FREE STATE.

TRACTOR WHEEL.

Application filed February 5, 1925, Serial No. 6,984, and in Great Britain July 15, 1924.

This invention relates to improvements in connection with tractor wheels, the object being to provide improved means to grip the ground where the ordinary driving tractor wheels lose their tractive power to a great degree especially where working on soft clay or boggy ground, another object being to provide simplified means for the foregoing purpose whereby greater power is obtained in projection of the ground grippers into operative position through the action of a single cam with a single screw operated lever.

In connection with wheels for tractors and other vehicles, it has hitherto been proposed to provide the rim of the wheel or wheels with a plurality of studs or prongs slidably fitted in the rim and directly connected to actuating mechanism whereby the studs or prongs may be projected from the rim of the wheel as the prongs come near the ground and whereby the studs or prongs may be retracted or withdrawn below the surface of the rim when not required for use. In these arrangements, the studs or prongs have been directly connected to an eccentric mounted directly on the axle of the wheel, and adjustably secured against movement for actuation of said prongs or studs. The studs or prongs have also been directly connected to a series of cams in a setting disc for the aforesaid purpose.

According to my present invention there is provided a series of outwardly and inwardly displaceable tractor-propelling revoluble ground grippers adapted to move in guides and provided with an operating contact cam not directly connected to the grippers, and adapted to outwardly displace the latter as they near the ground while permitting inward displacement of the grippers as they revolve out of the ground, the cam being preferably mounted on the stationary hub of the tractor and so taking strain off the revoluble ground wheel axle. The present construction and arrangement also permits of the ground wheels being readily jacked up by movement of the eccentric cam and so enabling the tractor (when blocked up) to be used for belt work or easy removal of the ground driving wheels.

Another advantage of my present invention is that when the ground grippers are mounted to one side of the ground wheel and spaced apart therefrom they prevent clogging of mud which would be likely to happen between the grippers and the ground wheel where the grippers pass through the rim of the ground wheel. Another advantage of my present invention is that it embodies a simplified and cheap form of construction readily applicable to existing ground wheels by clipping onto the wheels in one of its best forms hereinafter set forth, whereas in prior constructions ground wheels had to be specially constructed to accommodate the ground grippers which slidably fitted in bearings in the rims of these wheels.

My said invention is more fully described hereinafter and is illustrated by way of example in the accompanying explanatory drawing; and the same reference numbers are used for the same parts throughout.

In the drawing, Fig. 1 shows an outside elevation of tractive means for tractors, (with tractor wheel proper removed) of which a rear elevation is shown attached to an ordinary tractor wheel in Fig. 2. Fig. 3 shows a side elevation of a suitable form of combined spoke and guide for said tractive means. Fig. 4 shows a side elevation of suitable detachable gripping means of which a front elevation is shown in Fig. 5.

The propelling revoluble ground grippers indicated by 1 are arranged in a series, are capable of being outwardly and inwardly displaced and are slidably fitted in guides 2 and 3, an operating cam 4 being suitably shaped and being suitably positioned to rotate on the hub 5 of the machine 6 which latter is indicated by fragmentary lines. The cam 4 is adapted to outwardly displace the revoluble grippers 1 near the ground which is indicated by 7 so that the grippers 1 are thereby caused to sink into the ground to a greater depth than that of the tractive means on the periphery of the tractor ground wheel 8 which is usually provided on its periphery with a series of transverse ground gripping angle irons indicated by 9. The cam 4 is also adapted to permit inward displacement of the grippers 1 as they revolve out of the ground.

Springs 10, suitably anchored at 11 to the grippers 1 and suitably anchored at 12 to one of the inner pair of circular spiders 13 normally secure the grippers 1 in their inwardly displaced positions as they leave the ground and clear the cam 4, thereby preventing unnecessary movements of the grippers 1 and enabling them to keep clear of the ground when clear of the cam 4. The inner portions of the grippers 1 may have plain ends as at 15 or may be provided with rollers 16 to roll over the cam 4 respectively. Pairs of spaced apart spiders 13 and 17 are provided and have positioned between them connecting spokes 18 through all of which pass securing bolts 19 which latter also connect the outer pair of spiders 17 to the driving tractor wheel 8, or the spider 13 nearest to the wheel 8 might be connected by spokes in any known and suitable manner to the driving axle 20 of the wheel 8. If connected to the rim of the wheel 8, suitable securing brackets 21 may be employed and secured on the periphery of the wheel 8 between the angle irons 9 by means of bolts 22, and distance pieces 23 may be positioned between the brackets 21 and the usual channel iron 24 used to form the rim of the wheel 8. The grippers 1 are slidably positioned between the two pairs of spiders 13 and 17 and between the connecting spokes 18 which makes a compact, simplified and cheap to manufacture construction easily assembled or disassembled. The cam 4 is conveniently operated by means of an operating lever 25 having on its outer end a pivoted screw block 26 of the known kind in which works a screwed operating rod 27 which at its other end is provided with a thrust bearing 28 pivoted at 29 in a known manner to the body work of the machine 6, and is provided with an operating handle 30. Any other suitable means might be employed for causing outward and inward displacement of the grippers 1 for the purpose specified. The grippers 1 can also be provided with detachable gripping means, such as for example detachable grippers 31 (Figs. 4 and 5) bolted on at 32 to the grippers 1 which latter as shown in Figs. 1, 2 and 4, may have their outer ends twisted to a suitable transverse angle to afford an effective gripping surface in the ground. The detachable grippers 31 may readily be replaced without removal of the grippers 1 as and when required.

In operation, when greater tractive power is required, the operating handle 30 is rotated to move the cam 4 to outwardly displace the lower grippers 1 (Fig. 1) as the tractor moves in the direction of the arrow A. This operation is reversed to cause inward displacement of the grippers clear of the ground when not required as when travelling roads.

Having described my invention, I claim:—

In connection with tractor wheels and traction means applied thereto of the kind described, in combination with said tractor wheels, a series of outwardly and inwardly displaceable ground grippers 1, an operating cam 4 having attached thereto an operating lever 25 having at its outer end a pivoted screw block 26, an operating screw rod 27 adapted to work in said screw block, a pivoted thrust bearing 28 in which the operating rod 27 is adapted to revolve, on the outer end of the operating rod 27 an operating handle 30, the cam 4 being capable of outwardly displacing the grippers 1 as they near the ground while permitting of their inward displacement as they revolve out of the ground, springs 10 adapted to normally secure the grippers 1 in their inwardly displaced positions while permitting of their outward displacement, pairs of spaced apart spiders 13 and 17, spokes 18 connecting said spiders together, brackets 21 connecting said spiders to the tractor wheel, and grippers 1 arranged between the pairs of spiders 13 and 17 and between the connecting spokes 18.

Signed by me this 16th day of January, 1925.

JOHN SILLERY.